US012147860B2

(12) United States Patent
Lin et al.

(10) Patent No.: US 12,147,860 B2
(45) Date of Patent: Nov. 19, 2024

(54) SYSTEM AND METHOD FOR GENERATING A DYNAMIC MACHINE READABLE CODE

(71) Applicant: PayPal, Inc., San Jose, CA (US)

(72) Inventors: David Lin, Saratoga, CA (US); Aniruddha Dhamal, San Jose, CA (US); Justin Meier, San Francisco, CA (US); Sankiran Srinath, Sunnyvale, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 18/203,301

(22) Filed: May 30, 2023

(65) Prior Publication Data
US 2024/0028858 A1    Jan. 25, 2024

Related U.S. Application Data

(63) Continuation of application No. 17/322,614, filed on May 17, 2021, now Pat. No. 11,704,524, which is a
(Continued)

(51) Int. Cl.
*G06K 19/06*    (2006.01)
(52) U.S. Cl.
CPC .............................. *G06K 19/06037* (2013.01)
(58) Field of Classification Search
CPC ......... G06K 19/06037; G06Q 20/3276; G06Q 20/40; G06Q 20/38215
See application file for complete search history.

(56) References Cited

U.S. PATENT DOCUMENTS 8,380,177 B2    2/2013  Laracey
8,862,513 B2 *  10/2014 Wong ..................... G06Q 20/22
                                                    705/39
(Continued)

FOREIGN PATENT DOCUMENTS

CN    103942719 A    7/2014
CN    103944730 A    7/2014
(Continued)

OTHER PUBLICATIONS

Soon ("The easiest ways to transfer money using your smartphone", Feb. 16, 2018, http://www.hardwarezone.com.sg/feature-easiest-ways-transfer-money-using-your-smartphone/send-money-qr-code). (Year: 2018).*

(Continued)

*Primary Examiner* — Seung H Lee
(74) *Attorney, Agent, or Firm* — Haynes and Boone, LLP

(57) ABSTRACT

Aspects of the present disclosure involve systems, methods, devices, and the like for generating dynamic machine readable codes. In one embodiment, a system is introduced that enables the analysis of user information for the generation of the dynamic machine readable code. In response to the analysis, using middleware on a multi-tier system, user information is embedded onto the dynamic machine readable code. The embedded user information can be captured during the transaction enabling the presentation of customized content which can be used to provide a user friendly interface for the transacting while detecting incorrect account usage. In another embodiment, in conjunction with the dynamic machine readable code, additional user and/or device features are captured during the processing of a transaction such that the combination facilitate fraudulent activity detection.

20 Claims, 7 Drawing Sheets

Related U.S. Application Data continuation of application No. 16/601,496, filed on Oct. 14, 2019, now Pat. No. 11,010,649, which is a continuation of application No. 15/971,586, filed on May 4, 2018, now Pat. No. 10,445,630.

(56) References Cited

U.S. PATENT DOCUMENTS

| | | | |
|---|---|---|---|
| 9,710,804 | B2 | 7/2017 | Zhou et al. |
| 10,445,630 | B1 | 10/2019 | Lin et al. |
| 10,803,443 | B2 | 10/2020 | Tilahun et al. |
| 2009/0254479 | A1 | 10/2009 | Pharris |
| 2014/0310182 | A1 | 10/2014 | Cummins |
| 2015/0287029 | A1 | 10/2015 | Park et al. |
| 2015/0339460 | A1 | 11/2015 | Marsico |
| 2016/0027017 | A1 | 1/2016 | Chitragar |
| 2016/0217464 | A1 | 7/2016 | Jajara et al. |
| 2018/0025334 | A1 | 1/2018 | Pourfallah et al. |
| 2018/0330361 | A1* | 11/2018 | Marra ............... G06F 21/35 |
| 2019/0205865 | A1* | 7/2019 | Jamkhedkar ..... G06K 19/06037 |

FOREIGN PATENT DOCUMENTS

| | | |
|---|---|---|
| CN | 104781841 A | 7/2015 |
| CN | 105408927 A | 3/2016 |
| WO | 2006118968 A2 | 11/2006 |
| WO | 2016059486 A1 | 4/2016 |

OTHER PUBLICATIONS

Communication pursuant to Article 94(3) EPC for European Application No. 19796529.6 mailed on Mar. 2, 2023, 6 pages.

Communication pursuant to Article 94(3) EPC for European Application No. 19796529.6 mailed on Oct. 18, 2023, 5 pages.

Extended European Search Report for Application No. 19796529.6 mailed on Oct. 22, 2021, 8 pages.

International Appl. No. PCT/US2019/030749, International Preliminary Report on Patentability mailed Nov. 19, 2020, 6 pages.

International Appl. No. PCT/US2019/030749, International Search Report and Written Opinion dated Jun. 20, 2019, 6 pages.

* cited by examiner

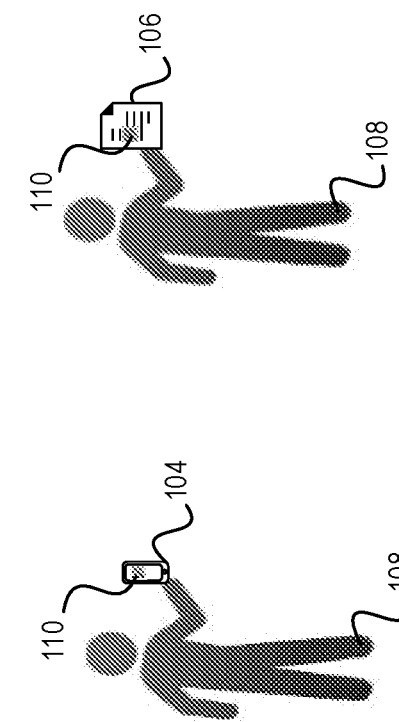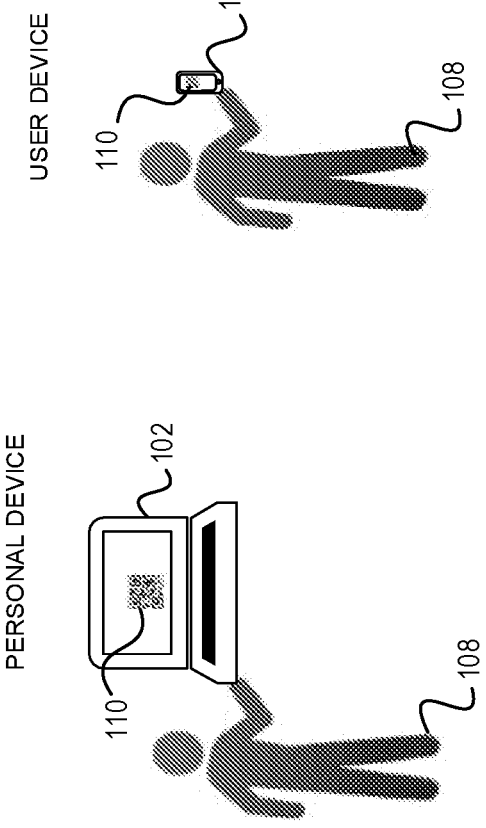

SYSTEM AND METHOD FOR GENERATING A DYNAMIC MACHINE READABLE CODE

CROSS REFERENCE TO RELATED APPLICATIONS

This application is a continuation of U.S. patent application Ser. No. 17/322,614, filed May 17, 2021, which is a continuation of U.S. patent application Ser. No. 16/601,496, filed on Oct. 14, 2019, and issued as U.S. Pat. No. 11,010,649 on May 18, 2021 which is a continuation of U.S. patent application Ser. No. 15/971,586, filed on May 4, 2018, and issued as U.S. Pat. No. 10,445,630 on Oct. 15, 2019, which applications are incorporated by reference in their entirety.

TECHNICAL FIELD

The present disclosure generally relates to machine readable codes, and more specifically, to dynamic machine readable codes.

BACKGROUND

Rapid advancements in technology and communications have led to the ubiquitous use of wireless electronics. As such, today's society has grown to become heavily device reliant. This reliance has led to the use of electronics to make monetary transactions for goods and services. For example, a smartphone may now be used to complete a purchase transaction at a merchant location. In some instances, machine readable codes may be used to complete such transaction. Unfortunately, the use of electronic devices and in particular machine readable codes may often leave a user susceptible to fraudulent activity. Therefore, it would be beneficial to create a system and method that generates machine readable codes that can be used to protect a user from such activity.

BRIEF DESCRIPTION OF THE FIGURES

FIGS. 1A-1C illustrates block diagrams of a first user interaction with one or more devices for performing a transaction.

Figure 2:
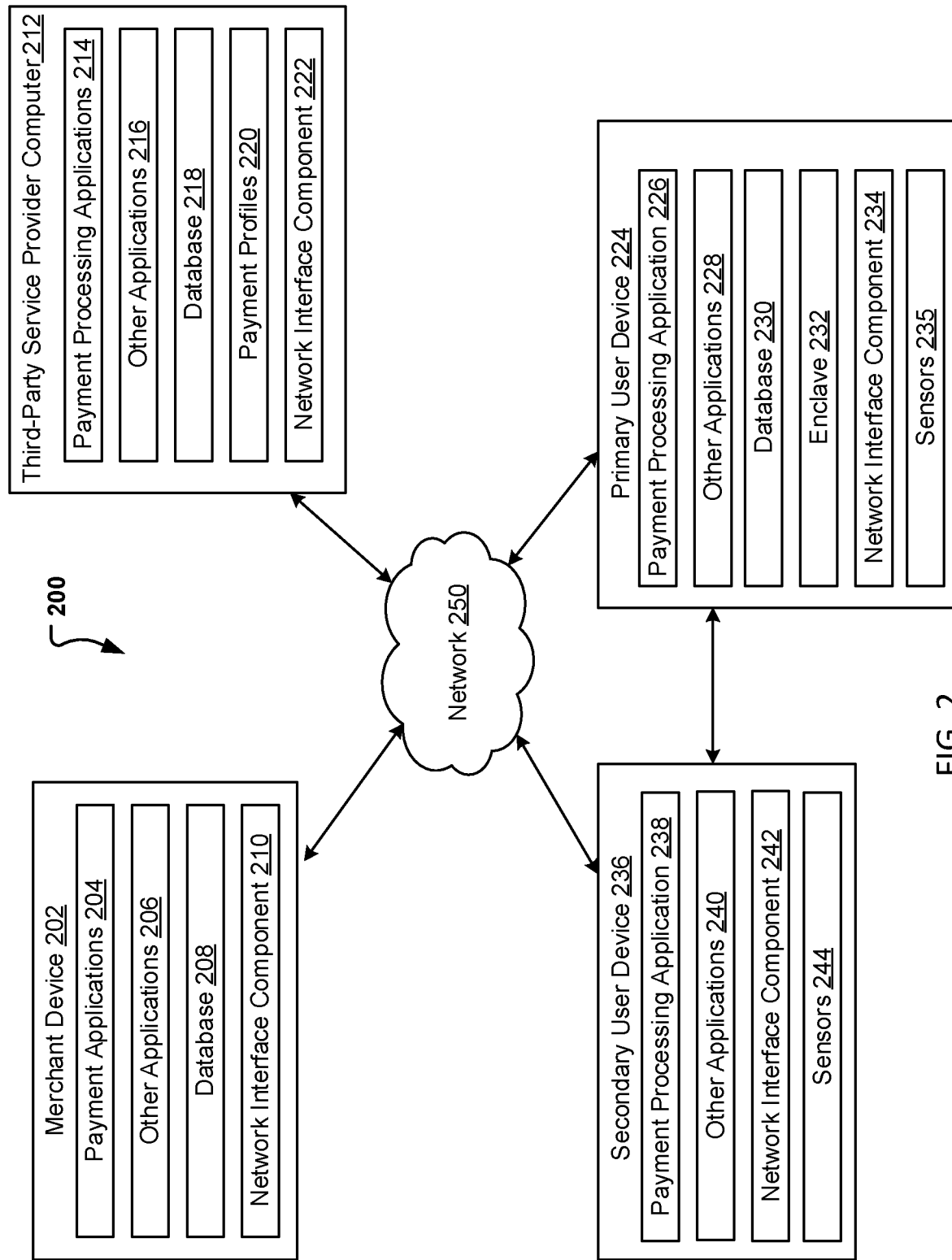
FIG. 2 is a block diagram of a system for performing a transaction using a dynamic machine readable code.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for generating dynamic machine readable codes. In one embodiment, a system is introduced that enables the analysis of user information for the generation of the dynamic machine readable code. In response to the analysis, using middleware on a multi-tier system, user information is embedded onto the dynamic machine readable code. The embedded user information can be captured during the transaction enabling the presentation of customized content which can be used to provide a user friendly interface for the transacting while detecting incorrect account usage. In another embodiment, in conjunction with the dynamic machine readable code, additional user and/or device features are captured during the processing of a transaction such that the combination facilitate fraudulent activity detection.

Rapid advances in communications have made portable electronic devices, such as smartphones and tablets, part of everyday life. Among other things, these electronic devices can be used to browse the web and stream video, and purchase goods and services. In some instances, one or more electronic devices can be used to make the purchase and in particular a machine readable code generated by the electronic device can be used to make the purchase. However, the use of the electronic device for making the purchase can leave the user susceptible to fraudulent activity.

Conventionally, a user may perform a transaction with a smart electronic device via the use of the machine readable code at an establishment. The use of such machine readable code however, may be vulnerable to fraudulent activity via an account take over, a stolen electronic device, a replication of the machine readable code, etc. Such fraudulent activity can lead to the loss of funds, loss of time, and can lead to an inconvenience to the user trying to resolve the issue.

Such vulnerabilities that derive from the use of a machine readable code can occur at various instances and locations. To illustrate this, FIGS. 1A-1C, include block diagrams 100 of a user performing a transaction using an exemplary machine readable code. For example, in FIG. 1A, a user 108 is interacting with a personal device 102 for performing one or more transactions. The personal device 102 may be a tablet, laptop, pc, or the like. For exemplary purposes, personal device 102 can be a laptop. Generally, personal device 102 can be used for numerous tasks including but not limited to web browsing, video streaming, bill pay, and purchase of goods and services. As illustrated, the user 108 of personal device 102 will perform the transaction with the use of a machine readable code 110. However, the personal device 102 such as a laptop with its use of the machine readable code may still be vulnerable to fraudulent actions by another user.

FIG. 1B illustrates user 108 interacting with a user device 104 for performing one or more transactions. The user device 104 may be a tablet, iPad, cell phone or the like. For exemplary purposes, user device 104 can be a smart phone.

The smart phone may be equipped with various applications for performing similar tasks as indicated with personal device 102. For example, the user device 104 may be used for web browsing, video streaming, bill payments, and online purchases. Additionally, the user device 104 be equipped with applications that enable the user to make purchases using a payment provider application and/or a digital wallet. Further, the user device 104 is capable of making phone calls and communicating with one or more other communications devices using a cellular network, Wi-Fi, Bluetooth, BLE, NFC, WLAN, etc. The communication can enable the transmission of information from a user account to a secondary source. For example, the user device 104 can be used to make a purchase for a good or service using an application or digital wallet. Here again, the user is transacting using the user device 104 with a digital wallet and/or machine readable code 110. The user 108 although now more mobile and is not exempt from fraudulent activity.

FIG. 1C illustrates a user 108 interacting with a printout 106 for performing a transaction. As an example, the printout 106 includes a machine readable code 110 for use in the transaction. Here, although the printout 106 is portable and accessible for purchases, the printout is still vulnerable as it may be replicated, lost, or stolen. Therefore, in order to mitigate the susceptibilities of the user to fraudulent activities and loss of funds, a system and method is introduced that alleviates such disadvantages.

In one embodiment, the a system and method is introduced to generate a dynamic machine readable code 110 equipped to dynamically customize the checkout experience based on user preferences which can aid in the identification of fraudulent activity. For example, during the completion of a transaction, the machine readable code may be read and automatically generate a user experience tailored for the user. As another example, during the completion of the transaction, the transacting device (e.g., personal device 102, user device 104, POS, etc) may read the customized machine readable code 110 in conjunction with user device 104 properties for user authentication. Still as another example, sensors on the user device 104 in conjunction with the customized machine readable code 110 are used to secure user identification and usage.

To enable such usage, FIG. 2 is introduced which illustrates a block diagram of a networked system 200 for implementing the processes described herein, according to an embodiment. In particular, FIG. 2 illustrates a block diagram of a system 200 for authenticating a user, transacting with a user, or detecting fraudulent activity by a user with an accessible machine readable code. System 200 illustrates at least some of the interactions between multiple entities and/or devices for the authentication, use and purchase of a product or service with a merchant, or other entity in association with a service provider. As shown, system 200 may include or implement a plurality of devices, computers, servers, and/or software components that operate to perform various methodologies in accordance with the described embodiments. It will be appreciated that the devices, computers, and/or servers illustrated in FIG. 2 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 200 includes a merchant or other entity device 202, a primary user device 224 (e.g., user device 104), a third-party service provider computer 212, and a secondary user device 236 (e.g., communication device 102) in communication over a network 250. The merchant device 202, primary user device 224, third-party service provider computer 212, and the secondary user device 236 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 200, and/or accessible over network 250.

The merchant device 202 may be implemented as a communication device that may utilize appropriate hardware and software configured for wired and/or wireless communication with the primary user device 224, third-party service provider computer 212, and/or secondary user device 236. For example, the merchant device 202 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, and/or other types of computing devices capable of transmitting and/or receiving data. The merchant device 202 may correspond to and be utilized by a user, such as an employee of a merchant and/or another person authorized by the merchant.

The merchant device 202 may include one or more payment applications 204, other applications 206, a database 208, and a network interface component 210. The payment applications 204 and other applications 206 may correspond to executable processes, procedures, and/or applications with associated hardware. In other embodiments, merchant device 202 may include additional or different components having specialized hardware and/or software to perform operations associated with the payment applications 204 and/or the other applications 206.

The payment application 204 may facilitate financial transactions corresponding to the sale of goods and/or services offered by the merchant. For example, the payment application 204 may provide an interface for customers to purchase the goods or services and to receive customer payment information (e.g., customer credit card information). The payment application 204 may further transmit customer payment information to a payment processor (e.g., such as a payment processor corresponding to the third-party service provider computer 212 or the secondary user device 236) to process the customer payment information. The payment application 204 may also facilitate other types of financial transactions such as banking, online payments, money transfer, and/or the like.

The merchant device 202 may execute the other applications 206 to perform various other tasks and/or operations corresponding to the merchant device 202. For example, the other applications 206 may include security applications for implementing client-side security features, programmatic client applications for interfacing with appropriate application programming interfaces (APIs) over network 250, or other types of applications. The other applications 206 may also include additional communication applications, such as email, texting, voice, and instant messaging (IM) applications that enable a user 106 to send and receive emails, calls, texts, and other notifications through the network 250. In various embodiments, the other applications 206 may include location detection applications, such as a mapping, compass, and/or global positioning system (GPS) applications, which may be used to determine a location of the merchant device 202. The other applications may 206 include social networking applications. Additionally, the other applications 206 may include device interfaces and other display modules that may receive input and/or output information including machine readable codes. For example, the other applications 206 may include a graphical user interface (GUI) configured to provide an interface to the user.

The merchant device 202 may further include a database 208, which may be stored in a memory and/or other storage device of the merchant device 202. The database 208 may include, for example, identifiers (IDs) such as operating system registry entries, cookies associated with the payment application 204, tokens, encryption keys, and/or other applications 206, IDs associated with hardware of the network interface component 210, IDs used for payment/user/device authentication or identification, and/or other appropriate IDs. The database 208 may also include information corresponding to one or purchase transactions of customers who have purchased goods or services from the merchant, browsing histories of the customers, or other types of customer information. In certain embodiments, the merchant device 202 may also include information corresponding to payment tokens, such as payment tokens, signs, codes, etc. generated by the third-party service provider computer 212 and/or generated by the secondary user device 236.

The merchant device 202 may also include at least one network interface component 210 configured to communicate with various other devices such as the primary user device 224, the third-party service provider computer 212, and/or the secondary user device 236. In various embodiments, network interface component 210 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 212 may be maintained, for example, by a third-party service provider, which may provide payment processing services for the merchant. In one example, the third-party service provider may be provided by PAYPAL®, Inc. of San Jose, CA, USA. Alternatively, the third-party service provider computer 212 may be associated with a user of the primary and secondary device 224, 236. As such, the third-party service provider computer 212 includes one or more payment processing applications 214, which may be configured to process payment information received from the merchant device 202 or from a selection at the primary or secondary user device 224, 236. For example, the payment application 204 of the merchant device 202 may receive payment information from a customer to purchase a service or good offered by the merchant. Upon receipt of the payment information, the payment application 204 may transmit the payment information to the third-party service provider computer 212. The payment processing application 214 of the third-party service provider computer 212 may receive and process the payment information. As another example, the payment application 204 can present a payment code on a display of the user device associated with the merchant. The payment code can be scanned or transmitted to the merchant device 202 for payment processing.

The third-party service provider computer 212 may execute the other applications 216 to perform various other tasks and/or operations corresponding to the third-party service provider computer 212. For example, the other applications 216 may include security applications for implementing client-side security features, programmatic client applications for interfacing with appropriate APIs over the network 250, or other types of applications. The other applications 216 may also include additional communication applications, such as email, texting, voice, and IM applications that enable communication of emails, calls, texts, and other notifications through the network 250. In various embodiments, the other applications 216 may include location detection applications, such as a mapping, compass, and/or GPS applications, which may be used to determine a location of the third-party service provider computer 212. Additionally, the other applications 216 may include device interfaces and other display modules that may receive input and/or output information. For example, the other applications 216 may include a GUI configured to provide an interface to one or more users.

The third-party service provider computer 212 may further include a database 218, which may be stored in a memory and/or other storage device of the third-party service provider computer 212. The database 218 may include, for example, IDs such as operating system registry entries, cookies associated with the payment processing application 214 and/or other the applications 216, IDs associated with hardware of the network interface component 222, IDs used for payment/user/device authentication or identification, and/or other appropriate IDs.

According to a particular embodiment, the third-party service provider computer 212 may include a set of payment profiles 220 corresponding to past sales transactions executed by the merchant device 202 with respect to one or more customers of the merchant. Alternatively, the third-party service provider computer 212 may include a set of merchant payment profiles corresponding to the payment sources associated to a corresponding merchant. For example, a particular payment profile from the set of payment profiles 220 may include payment information corresponding to a particular customer of the merchant and/or a merchant associated with a user. The payment information may include credit card information (e.g., card number, expiration date, security code, card issuer, and/or the like), Automated Clearing House (ACH) information (e.g., account number, routing number, and/or the like), identification information associated with the particular customer/user (e.g., a customer identifier, name, address, phone number, date of birth, and/or the like), billing information, and/or any other type of payment information associated with the particular customer. Furthermore, other payment profiles of the set of payment profiles 220 may include payment information corresponding to other customers of the merchant and/or other merchants associated with the user. In addition, the third-party service provider computer 212 may store the set of payment profiles 220 according to a first file format.

The third-party service provider computer 212 may also store a set of payment tokens corresponding to the set of payment profiles 220. For example, each payment profile of the set of payment profiles 220 may be associated with a corresponding payment token from the set of payment tokens. In some embodiments, each payment profile may include a corresponding payment token from the set of payment tokens. The set of payment tokens may be particular to the third-party service provider computer 212 (e.g., computers from other service providers may be unable to use the set of payment tokens) and may enable the merchant device 202 to more securely process payment transactions with the third-party service provider computer 212. For example, in order to process a payment transaction that involves a credit card number associated with a particular payment profile, the third-party service provider computer 212 may provide the merchant device 202 with a particular payment token that is different from the credit card number. The merchant device 202 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 202.

In various embodiments, the third-party service provider computer 212 also includes at least one network interface component 222 that is configured to communicate with the merchant device 202, the primary user device 224, and/or the secondary user device 236 via the network 250. Further, the network interface component 222 may comprise a DSL modem, a PSTN modem, an Ethernet device, a broadband device, a satellite device and/or various other types of wired and/or wireless network communication devices including microwave, RF, and IR communication devices.

The primary user device 224 may be implemented as a communication device that may utilize appropriate hardware and software configured for wired and/or wireless communication with the merchant device 202, third-party service provider computer 212, and/or the secondary user device 236. The primary user device 224, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 224 may be mobile device 102 communicating with second device 104, a merchant device and/or service provider 212.

The primary user device 224 may include a payment processing application 226 that may be used as a digital wallet that can communicate with a merchant device 202, secondary user device 236, and/or third party service provider 212 for purchasing and transacting. The payment processing application 226, can work jointly with database 230 for retrieving bank account information, user accounts, security codes, tokens that may be associated with various merchant locations. Similarly, the payment processing application, can also provide access to the user profiles for determining which payment method, processing code, to use at a merchant location. The primary user device 224 may include an enclave 232 which can be a secure hardware level storage are designated for the payment processing application 226. The enclave 232 can enable the storage of private and public keys and a randomly generated token that enables the secure communication and validation of the user of the payment processing application with the third party service provider 212.

In one embodiment, the primary device (user device 104) uses the private key and secure token encryption for communicating with the payment processing application 226. In another embodiment, user device uses generates and uses a dynamic machine readable code for processing the payment on the payment processing application. The dynamic machine readable code included user information which may be embedded into the code in response to a request to process a transaction using at least the dynamic machine readable code. The dynamic machine readable code may then be captured by a secondary user device 236, merchant device 202 or other device for processing the transaction. In some embodiments, further to the capture of the dynamic machine readable code, additional information may be captured and used in the processing. For example, in some instances, device type, image resolution, screen lock, etc., may be captured. In other instances, additional device information may be captured including information captured by sensors located within the user device. For example, location, movement, light, audio, video, images, orientation, may be recorded by sensors on the user device and used in conjunction with and/or embedded on the dynamic machine readable code.

The primary user device 224 may also include other applications 228 to perform various other tasks and/or operations corresponding to the primary user device 224. For example, the other applications 228 may facilitate communication with the merchant device 202, such as to receive an indication, from the merchant device 202, to switch payment processing services from the third-party service provider to the service provider. As another example, the other applications 228 may include security applications, application that enable designation of a primary interactive device, and applications that allow for web site access (including access to merchant websites). The other applications 228 may also include additional communication applications, such as email, texting, voice, and IM applications that enable communication of emails, calls, texts, and other notifications through the network 250. In various embodiments, the other applications 228 may include location detection applications, such as a mapping, compass, and/or GPS applications, which may be used to determine a location of the user device 224. The other applications may 228 social networking applications. Additionally, the other applications 228 may include device interfaces and other display modules that may receive input and/or output information. For example, the other applications 228 may include a GUI configured to provide an interface to one or more users.

The primary user device 224 may further include a database 230, which may be stored in a memory and/or other storage device of the primary user device 224. The database 230 may include, for example, identifiers (IDs) such as operating system registry entries, cookies associated with a web browser and/or the other applications 228, IDs associated with hardware of the network interface component 234, IDs used for payment/user/device authentication or identification, bank information, merchant information, user accounts, and/or other appropriate IDs. In addition, the database 230 may include user identifier information which can be used in conjunction with secondary user device 236 during an explicit code exchange and/or contextual information for web browser authentication.

Primary user device 224, can also be equipped with various sensors 234 to provide sensed characteristics about the primary user device 224 and its environment. For example, the sensors 234 can include a camera for taking images of the surroundings used to determine the information to provide a user (e.g., camera take image of Macy's so a Macy's QR code is presented on the primary interactive device). As another example, the sensors 234 can include microphones for receiving audio signals which can be used to detect location, and other relevant terms that may be spoken. Further, the sensors 234 can include an accelerometer, a light sensor, a biometric sensor, temperature sensor, etc. For example, the biometric sensor can be used to collect a user fingerprint scan. Each type of sensor providing various characteristics about the device, user, or environment.

The primary user device 224 may also include at least one network interface component 110 configured to communicate with various other devices such as the merchant device 202, the third-party service provider computer 212, and/or the secondary user device 236. In various embodiments, network interface component 234 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

As indicated above, a secondary user device 236 (e.g., user device 104) may be presently available and used by a consumer (e.g., user 108). The secondary user device 236, much like the primary user device may be equipped with payment processing applications 238 as well as other applications 240. The payment processing applications 238 and other applications 240 may be used to perform various tasks and/or operations corresponding to the secondary user device 236. The other applications 228 may include additional communication applications, such as email, texting, voice, and IM applications that enable communication of emails, calls, texts, and other notifications through the network 250. In addition, the other applications 228 may include location detection applications, such as a mapping, compass, and/or GPS applications, which may be used to determine a location of the secondary user device 236. The other applications may further include 228 social networking applications and device interfaces and other display modules that may receive input and/or output information.

For example, the applications 238, 240 may facilitate communication with the merchant device 202, such as by presenting a QR code that may be used for making a purchase. As another example, the applications 238, 240 may provide notice of an incoming call or text to the user 106 of the secondary user device 236. Still as another example, the applications 238,240 can provide details and/or login information for authentication by the primary user device 224.

The secondary user device 236 may also include a network interface component 242 for connecting and interacting with at least primary user device 224, merchant user device 202, and/or third-party service provider computer 212 over network 250. The network interface component 242 may comprise a DSL modem, a PSTN modem, an Ethernet device, a broadband device, a satellite device and/or various other types of wired and/or wireless network communication devices including microwave, RF, and IR communication devices.

The network 250 may be implemented as a single network or a combination of multiple networks. For example, in various embodiments, the network 250 may include the Internet or one or more intranets, landline networks, wireless networks, and/or other appropriate types of networks. Thus, the network 250 may correspond to small scale communication networks, such as a private or local area network, or a larger scale network, such as a wide area network or the Internet, accessible by the various components of system 200.

In addition, the secondary user device 236 can also include sensors 244 that may be used for providing measured information about the user, device, location, environment, etc. The sensors can be used to detect light (is device in a pocket, indoors, outside, etc.), biometric data (is user working out), location (user is in a meeting, call received), etc. Further, the sensors 244 can also be used to determine proximity between devices and location of interest as well as determine processor usage and/or signal strength, location, etc. which may be used to characterize the device for determining the interaction state of the primary user device 224.

As indicated, the sensors on the primary user device 224 may be used in conjunction with the dynamic machine readable code for enabling the processing of a transaction. For example, in an instance where a discrepancy or mismatch exists between the embedded information and the information captured or sensed, then a transaction cancellation or at least notification may be pushed. The notification may be sent to the primary user device 224 notifying the user of possible fraudulent activity, and/or occur at a secondary user device 236 or merchant device 202 with an indication of a failed transaction.

Figure 3:
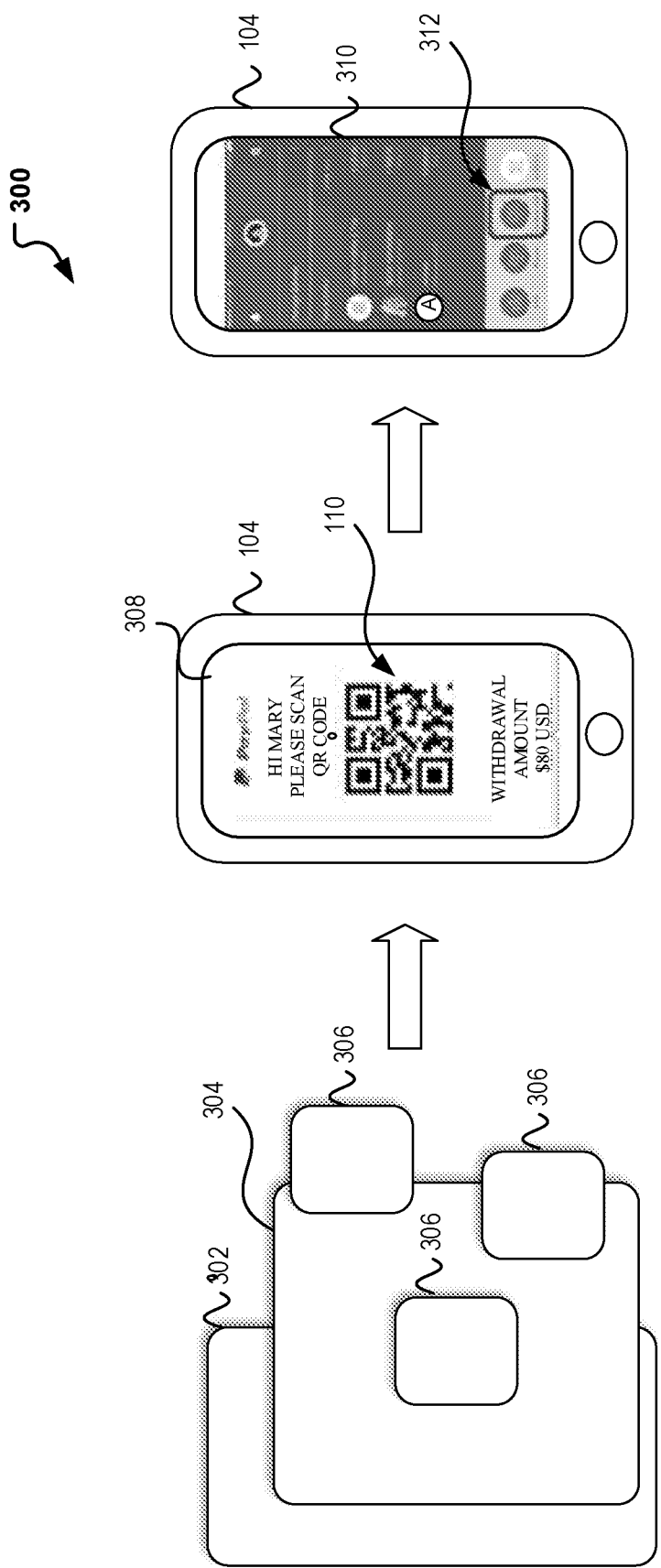
FIG. 3 illustrates a communication with a user device for generating a dynamic machine readable code.
Figure 4:
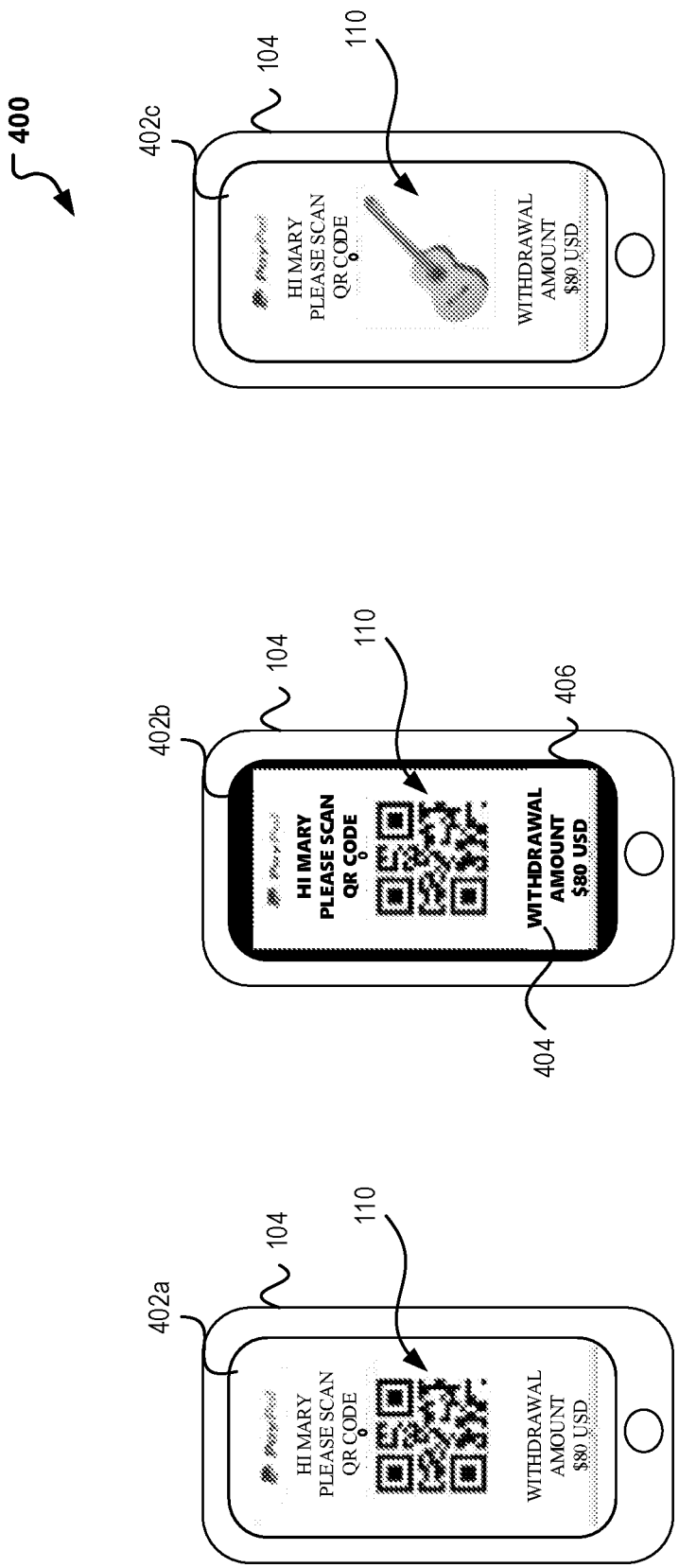
FIG. 4 illustrates a communication with a user device for using a dynamic machine readable code for fraudulent activity detection.
Figure 5:
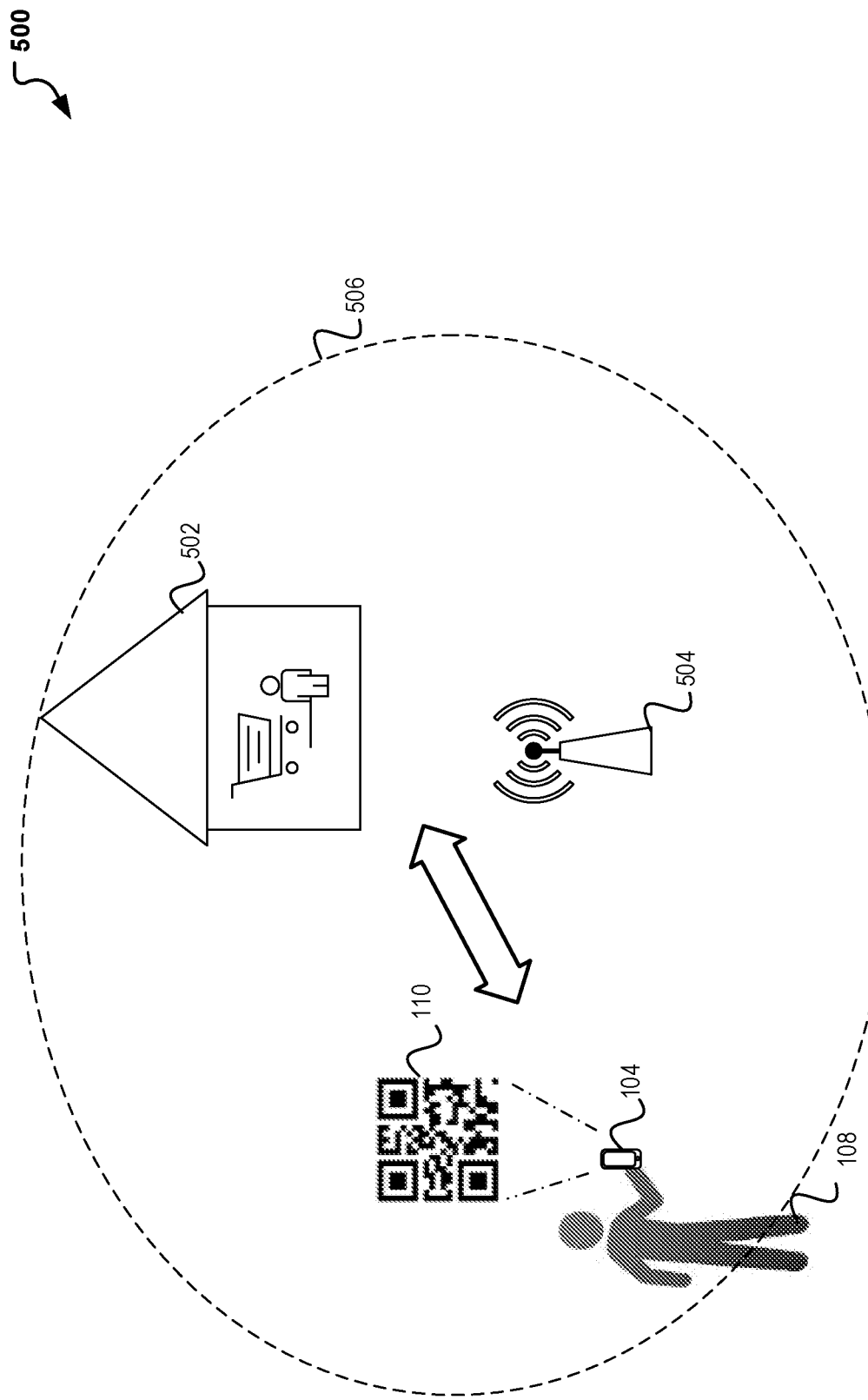
FIG. 5 illustrates another communication with a user device for using a dynamic machine readable code for fraudulent activity detection.

FIGS. 3-5 provide exemplary embodiments illustrating a communication and transaction over a user device 104 using a dynamic machine readable code 110. In particular, diagrams 300 of FIG. 3 illustrate the generation of the dynamic machine readable code 110 and the resulting customization of the user UI 308. As illustrated in FIG. 3, the generation of the dynamic machine readable code 110 can occur at the middle tier layer 304. As understood, presentation, application, and data management often occur in a multi-tier client-server architecture. Most often, a three-tier architecture is used. The three tiers commonly include a presentation (client) tier 302, a logic (middle) tier 304, and a data (back-end) tier 306. The presentation or client tier 302, as the name indicates, is generally used for the presentation of information and is the application including the user interface. The primary task of the presentation tier is to translate information received from other tiers 304, 306 and present it in a manner that the user 108 can best understand it. The data or back-end tier 306 is the tier where data may be stored and retrieved, that will be used and presented by the presentation tier 302. The back-end tier 306 can store or retrieve and process the data, which may be located locally and/or remotely in databases, data structures, servers, clouds, and other file systems. Midway between the client tier 302 and the back-end tier 306 is the logic or middle tier 304. The middle tier 306 performs the data manipulation stored and/or retrieved from the back-end tier for presentation on the client tier 302. Data manipulation can include performing the logical processes including but not limited to the coordination, processing, evaluation, and calculation of data. Therefore, generally speaking, the middle tier 304 can be responsible for the reading and writing of data. That is to say, the middle tier can read the data retrieved and deliver it to the presentation tier 302 and/or can manipulate the data retrieved. Oftentimes, software solutions known as middleware may be used for such implementations on the middle tier 304.

In one embodiment, the middle tier 304 is designed to manipulate user profile information retrieved to generate a dynamic machine readable code 110. The dynamic machine readable code 110 can be designed to include user details including but not limited to an amount for a purchase, user account information, and other user preferences that would allow for UI customization based on the information embedded within the dynamic machine readable code 110.

For example, turning to user device 104, a customized dynamically generated machine readable code 110 (e.g., QR code) is presented on the user interface (UI) 308. As illustrated, the dynamically generated machine readable code 110 can be displayed on the UI 308 for use in a transaction. The dynamically generated machine readable code 110 can be generated to include user account information, preferences and other customizable information relevant for the transaction and useful in fraudulent activity detection. The user information may be embedded into the dynamically generated machine readable code 110 via the middle tier 306. Additionally, the middle tier 306 may also include other customizable information which can be displayed on the UI 308. As an example, UI 308 illustrates the inclusion of the user name Mary and transaction amount (e.g., $80) which can help confirm to the seller or other individual/entity that Mary should be the person performing the transaction.

In one embodiment, once the dynamic machine readable code 110 has been scanned, user information that was embedded into the dynamic machine readable code 100 may be presented on a UI of the receiving party. This user information can then be used for verification purposes. For example, user address, email, date of birth, photo, etc. can be included which can be asked by the receiving party. Additionally or alternatively, once the dynamic machine readable code 110 is scanned, the user may be presented with a customized home page illustrating a customized UI 308 most agreeable to the user 108. In FIG. 3, for example, the service provider application (e.g., PayPal) may appear which includes Mary's photo, latest transactions, menu bar 312 and other relevant information to Mary. Illustrated here, is a menu bar 312 that includes not only send and request options, but also a cardless cash option 312 that may have been added by the user 312 as a preferred transacting option.

In another embodiment, once the dynamic machine readable code 110 has been scanned, user information that was embedded into the dynamic machine readable code 110 may trigger the use of a web browser that is again customized to the user preferences. For example, in the case where a personal device 102 is used, the user's payment provider home screen may be presented. Like the UI 310, the website is customized to user preference. In some instances, in addition to the layout and user selection options, the website can have larger or smaller font and a more involved/simplified layout if it is so determined based on preference. In other instances, general knowledge about the user 108 (e.g., age) can be used to present a website more suitable for the user 108. For example, an elder man may like larger font, where a millennial may prefer a different UI adapted to make transactions faster and more efficient. The preferences may thus be embedded on the dynamic machine readable code 110, which can dynamically prompt the customized uniform resource locator (URL) to display on the personal device 102.

Turning to FIG. 4, the use of the dynamic machine readable code 110 and other features for transacting and fraudulent activity detection is illustrated in diagrams 400. As previously indicated, the middle tier 304 can be used to generate a dynamic machine readable code 110 and in some instances transmit additional user information to the presentation tier 302. In FIG. 4, again user device 104 is illustrated which includes a UI 402a with the dynamic machine readable code 110 along with basic user information which can be used for fraud detection.

In one embodiment, further to the user information and preferences that may be embedded in the dynamic machine readable code 110, additional phone features may be used for the detection of fraudulent activity. For example, as illustrated on UI 402b may have additional customization features that the user 108 is aware of. For example, the user may have a screen saver with a light hue in the background which can be read during the transaction and used for user verification and authorization. Additionally, a change in user font size, style 404, and insertion of additional characters can be detected.

In another embodiment, in addition to the dynamic machine readable code 110 known user device 104 properties may be used for transacting and authenticating. For example, during a transaction, it can be recognized that a user 108 has a certain phone type and brand. The phone type and brand can thus be used and compared against user information transmitted. To illustrate, consider a user 108 making a purchase at a department store. The user 108 can present the UI 402b for payment. At the department store the point of sale system can scan not only the dynamic machine readable code 110, but further capture features about the phone. Features can include the resolution, font, style, pictures and other information which can be used to verify the user's identity. In some embodiments, the user's phone information can also be embedded into the dynamic machine readable code 110 such that once scanned, the details embedded should match the user device 104 used.

In yet another embodiment, the dynamic machine readable code 110 is embedded in a recognizable object. As an illustration, UI 402c illustrates the use of a guitar which can include the user profile information, transaction amount, phone type, and other useful information that can help with user verification and authentication. For example, embedded, by the middle tier 304, into the figure can include user information which may be used to ask and confirmed user identity. The figure can be generated dynamically as does the dynamic machine readable code based on a predefined set of objects selected by the user. Alternatively, the object displayed may be a single predefined object which is recognized by the user to be the dynamic machine readable code for use in transacting. In addition, further to the use of the object, user device 104 properties can be scanned, recognized and used in the transaction. As indicated, user device 104 properties can include resolution, background, device type, text located near or around the dynamic machine readable code 110, etc.

Note that although the various embodiments are presented on a user device 104, a personal device 102, other smart device, a picture, or printout 106 may be used for transacting. The middle tier 304 can still generate the dynamic machine readable code 110 and use the embedded information and surrounding properties for fraudulent activity prevention.

Turning to FIG. 5, an extension to the use of the dynamic machine readable code 110 is presented. In particular, FIG. 5 illustrates another communication with a user device 104 for using a dynamic machine readable code 110 for fraudulent activity detection. As illustrated in block diagram 500, user 108 is in the process of transacting at an entity 502. The entity 502 can be a department store, coffee shop, grocery store, retail shop, or the like. For exemplary purposes, the entity 502 is a retail shop.

The user is in the vicinity of the retail shop 502 and geographically located within a geofence 506. The geofence 506 can be designated based on a signal capture from a cellular basestation 504, a beacon at the retail shop, or via short range signal communications capture by Bluetooth, NFC, Wi-Fi, and the like. Thus, a user geographical location can be identified and used in conjunction with the dynamic machine readable code to enable correct user identification. Therefore, if the user 108 presents the dynamic machine readable code 110 (even if it is a photo), location information may be used to determine correct identity. In some instances, a user device 104 in conjunction with a secondary smart device may be used for detection. For example, the user device 104 maybe associated with a smart watch (not shown) and if the location of both devices does not match flags, warnings, messages, push notifications, etc. can be sent to the user regarding possible fraudulent activity. Additionally or alternatively, the dynamic machine readable code 110 can embedded additional details which can trigger the retail shop 502 to request additional authentication information.

Note that further to user 104 or user device 104 location information, Wi-Fi connections, other properties and characteristics, such as lighting, speed of movement, presence of others within the users contact list or social network can be used for fraudulent activity detection. As an example, sensors located on the user device 104 can be used to locate if the user is outside for example base on lighting, is moving, and/or is near other friends whose social conversations and/or postings indicate a gathering. Additionally, a user device 104 microphone and camera can also be used to ensure correct user detection via voice/facial recognition. For authentication purposes, the dynamic machine readable code 110 can include embedded details that relate to such activity.

Figure 6:
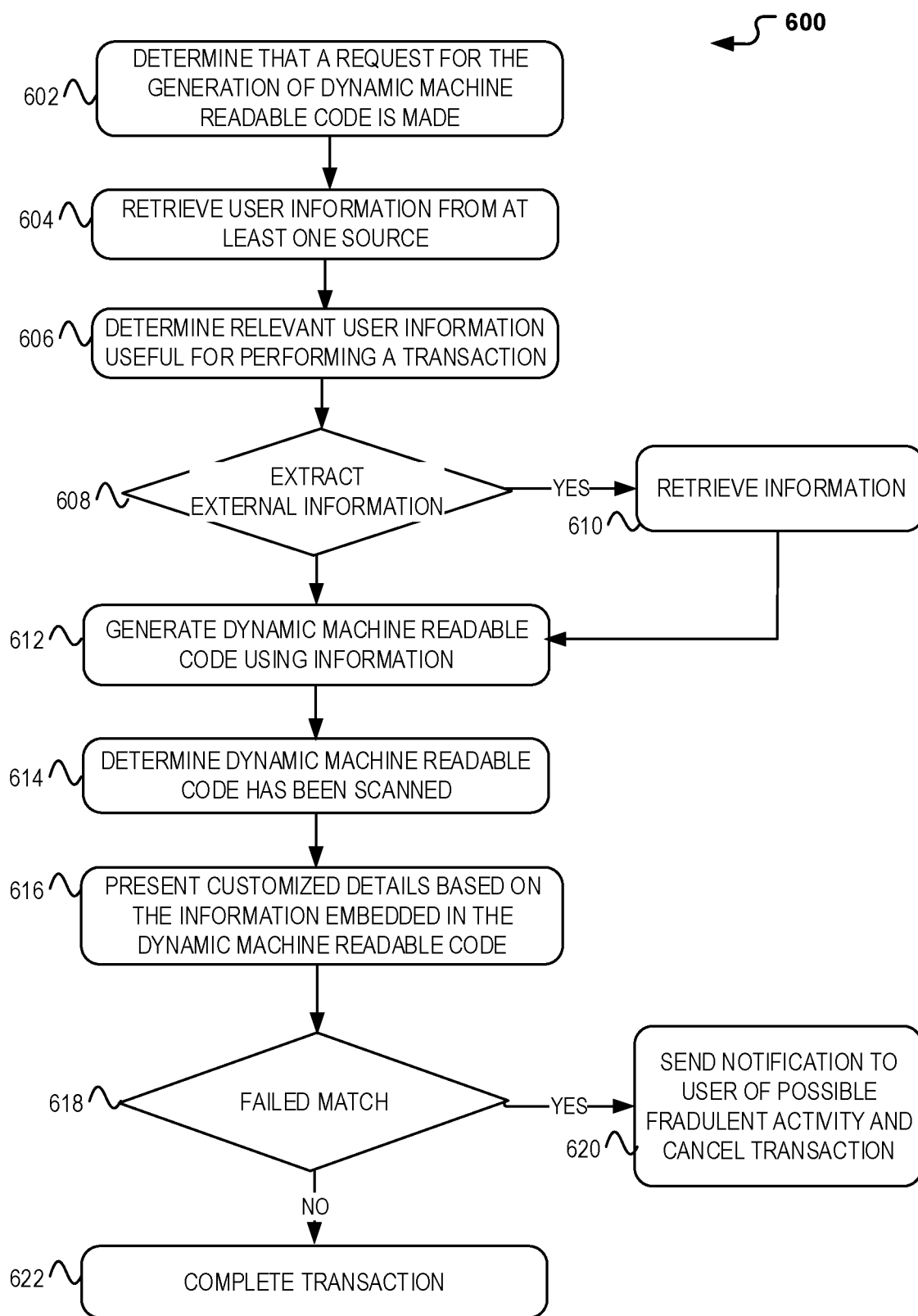
FIG. 6 illustrates a flow diagram of a system for generating a dynamic machine readable code.

FIG. 6 illustrates an example process 600 for generating a dynamic machine readable code 110 by a system, as described by the block diagrams of FIGS. 2-5. In particular, FIG. 6 includes a flow diagram illustrating operations for transacting generating and transacting using the dynamic machine readable code 110. According to some embodiments, process 600 may include one or more of operations 602-622, which may be implemented, at least in part, in the form of executable code stored on a non-transitory, tangible, machine readable media that, when run on one or more hardware processors, may cause a system to perform one or more of the operations 602-622.

Process 600 begins with operation 602, where a user interested in making a transaction using a machine readable code indicates such desire. The request to use a machine readable code may occur on a financial entity application where a selection is made to generate such code. As such, at operation 602, a user device, personal computer, or other such device may determine that a request has been made for the generation of the dynamic machine readable code.

Once the request has been received, at operation 604, a communication between the user device and one or more other entities/sources (service provider, server, financial institution, database or file system) occurs. Such communication includes at least an exchange of information identifying the user and the retrieval of user information from the at least one source. As indicated above and in conjunction with FIGS. 2-4, user information which can be retrieved can include account information, profile information, user preferences, user demographics, and other relevant details which can aid in the identification of the user. At operation 606, the details retrieved can be categorized, analyzed, and/or manipulated to determine, what information is needed for the transaction and will be embedded in the dynamic machine readable code. In some instances, process 600 can include operation 606 before 604 where type and what relevant information is useful for this transaction and then retrieving that specific information.

At operation 608, a determination is made as to whether additional external information is needed and should be included in the dynamic machine readable code. For example, as indicated above and in conjunction with FIGS. 4 and 5, user device details, network connectivity, user device geographical location, sensed data, and the like may be used for fraudulent activity detection. Therefore, at operation 608, a determination is made as to whether at least some of the external details should be included and retrieved at operation 610 before continuing to operation 612. At operation 612, the generation of the dynamic machine readable code occurs. At this stage in the process, the user information and/or the external information retrieved is embedded into the dynamic machine readable code and generated by the middle tier layer for use in transacting.

Once the dynamic machine readable code has been generated it may be photographed, copied, printed, or simply scanned from the device. The use and scan of the dynamic machine readable code is detected at operation 614. Upon scanning the dynamic machine readable code, a customized user interface may be presented to the user and/or the entity where the transaction is occurring. For example, scanning the code can lead to a customized website that may be presented to the user on his/her device tailored to include user preferences. As another example, scanning the code can present the receiving entity with user details (e.g., photo, address, birthday, account information, etc.) which can be used for verification.

At operation 618, the information is checked against what was retrieved from the scan. If a failed match exists, then process 600 continues to operation 620 where a notification may be sent to the user indicating the possibility of fraudulent activity and possible cancellation of the transaction. Alternatively, if not failed match exists, then process 600 continues to operation 622 where the transaction is completed.

As an illustration, process 600 can include receiving, over a first wireless network connection, a request from a user device to generate a dynamic machine readable code; retrieving, from a first source, user information associated with the user of the user device; analyze the user information to determine a first user information to include on the dynamic machine readable code; detecting, a capture of the dynamic machine readable code; and in response to the detecting, presenting a customized user interface based on the first user information embedded on the dynamic machine readable code. The user information can be embedded onto the dynamic machine readable code using a middle tier using at least middleware and the user information includes at least a photo, email, data birth, account information, etc.

In some instances, in response to receiving a request to retrieve a dynamic machine readable code, additional device information associated with the user of the user device may also be retrieved and used in and/or captured during the scan of the dynamic machine readable code. In some instances, where the dynamic machine readable code and additional device information retrieved do not match, a determination may be made that fraudulent activity may exist. This can be determined through the computation of a correlation, probability, or a threshold statistic that is not met or achieved. As indicated, in this instance, a notification and/or transaction cancellation may occur.

Figure 7:
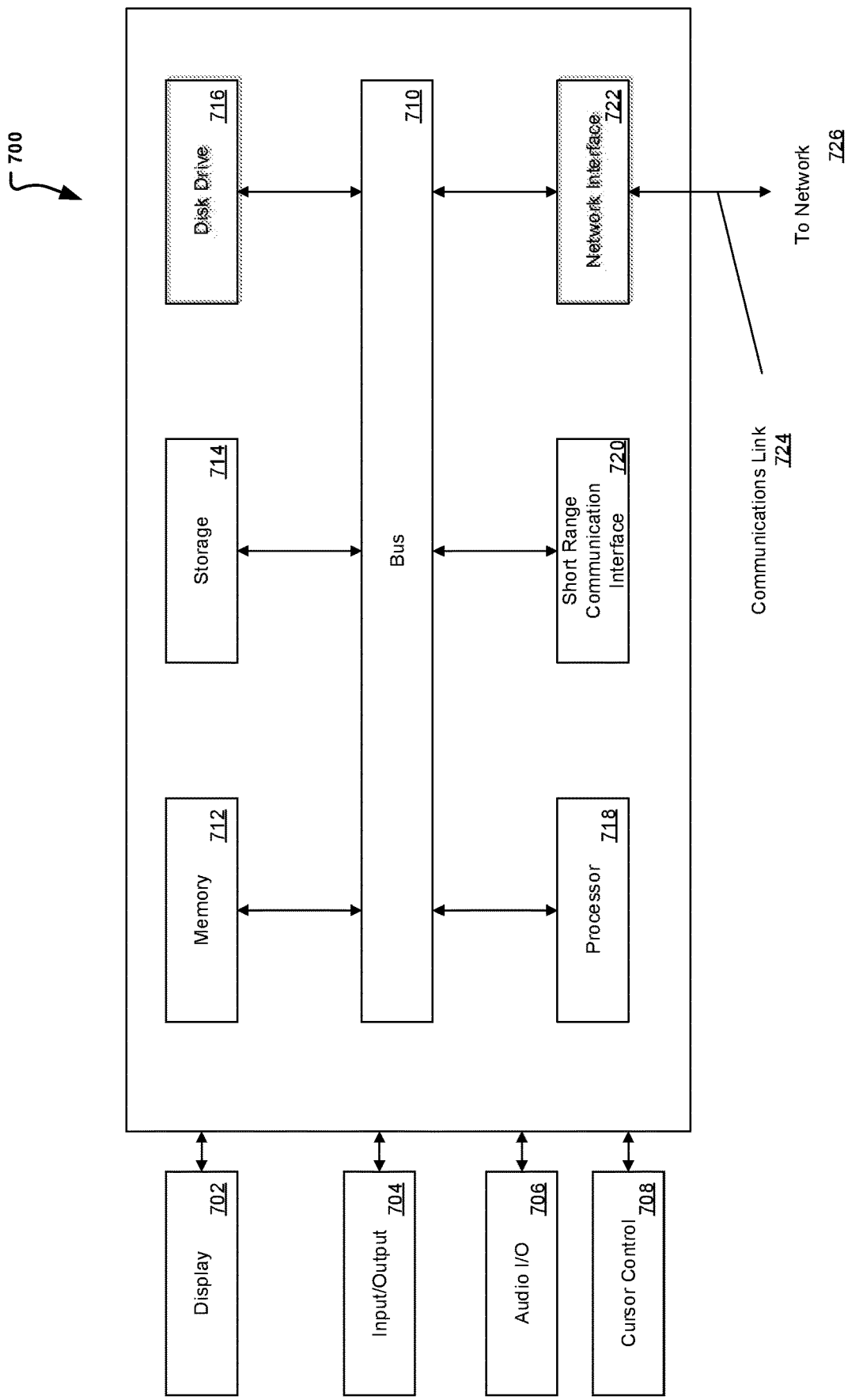
FIG. 7 illustrates an example block diagram of a computer system suitable for implementing one or more devices of the communication systems of FIGS. 1-5.

FIG. 7 illustrates an example computer system 700 in block diagram format suitable for implementing on one or more devices of the system in FIGS. 1-6. In various implementations, a device that includes computer system 700 may comprise a personal computing device (e.g., a smart or mobile device, a computing tablet, a personal computer, laptop, wearable device, PDA, etc.) that is capable of communicating with a network 726 (e.g., network 250). A service provider and/or a content provider may utilize a network computing device (e.g., a network server) capable of communicating with the network. It should be appreciated that each of the devices utilized by users, service providers, and content providers may be implemented as computer system 700 in a manner as follows.

Additionally, as more and more devices become communication capable, such as new smart devices using wireless communication to report, track, message, relay information and so forth, these devices may be part of computer system 700. For example, windows, walls, and other objects may double as touch screen devices for users to interact with. Such devices may be incorporated with the systems discussed herein.

Computer system 700 may include a bus 710 or other communication mechanisms for communicating information data, signals, and information between various components of computer system 700. Components include an input/output (I/O) component 704 that processes a user action, such as selecting keys from a keypad/keyboard, selecting one or more buttons, links, actuatable elements, etc., and sending a corresponding signal to bus 710. I/O component 804 may also include an output component, such as a display 702 and a cursor control 708 (such as a keyboard, keypad, mouse, touchscreen, etc.). In some examples, I/O component 704 other devices, such as another user device, a merchant server, an email server, application service provider, web server, a payment provider server, an ATM server, and/or other servers via a network. In various embodiments, such as for many cellular telephone and other mobile device embodiments, this transmission may be wireless, although other transmission mediums and methods may also be suitable. A processor 718, which may be a microcontroller, digital signal processor (DSP), or other processing component, that processes these various signals, such as for display on computer system 700 or transmission to other devices over a network 726 via a communication link 724. Again, communication link 724 may be a wireless communication in some embodiments. Processor 718 may also control transmission of information, such as cookies, IP addresses, images, and/or the like to other devices.

Components of computer system 700 also include a system memory component 714 (e.g., RAM), a static storage component 714 (e.g., ROM), and/or a disk drive 716. Computer system 700 performs specific operations by processor 718 and other components by executing one or more sequences of instructions contained in system memory component 712 (e.g., for engagement level determination). Logic may be encoded in a computer readable medium, which may refer to any medium that participates in providing instructions to processor 718 for execution. Such a medium may take many forms, including but not limited to, non-volatile media, volatile media, and/or transmission media. In various implementations, non-volatile media includes optical or magnetic disks, volatile media includes dynamic memory such as system memory component 712, and transmission media includes coaxial cables, copper wire, and fiber optics, including wires that comprise bus 710. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 700 may also include a short range communications interface 720. Short range communications interface 720, in various embodiments, may include transceiver circuitry, an antenna, and/or waveguide. Short range communications interface 720 may use one or more short-range wireless communication technologies, protocols, and/or standards (e.g., WiFi, Bluetooth®, Bluetooth Low Energy (BLE), infrared, NFC, etc.).

Short range communications interface 720, in various embodiments, may be configured to detect other devices (e.g., device 104, ATM 106, etc.) with short range communications technology near computer system 700. Short range communications interface 720 may create a communication area for detecting other devices with short range communication capabilities. When other devices with short range communications capabilities are placed in the communication area of short range communications interface 720, short range communications interface 720 may detect the other devices and exchange data with the other devices. Short range communications interface 720 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 720 may identify a local area network using a short range communications protocol, such as WiFi, and join the local area network. In some examples, computer system 700 may discover and/or communicate with other devices that are a part of the local area network using short range communications interface 720. In some embodiments, short range communications interface 720 may further exchange data and information with the other devices that are communicatively coupled with short range communications interface 720.

In various embodiments of the present disclosure, execution of instruction sequences to practice the present disclosure may be performed by computer system 700. In various other embodiments of the present disclosure, a plurality of computer systems 700 coupled by communication link 724 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 724 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising
a non-transitory memory; and
one or more hardware processors coupled to the non-transitory memory and configured to read instructions from the non-transitory memory to cause the system to perform operations comprising:
detecting, over a network connection, a data processing interaction occurring between a first computing device of a first user and a second computing device of a second user;
generating dynamic machine-readable code based on the data processing interaction between the first computing device and the second computing device and data associated with the first computing device, wherein the dynamic machine-readable code includes user information associated with the first user embedded into the dynamic machine-readable code based on the data processing interaction; and
causing to be displayed, via a visual display component of the first computing device, the dynamic machine-readable code in an application interface of an application on the first computing device, wherein the dynamic machine-readable code is displayed via the visual display component that enables an image capture of the dynamic machine-readable code by the second computing device.

2. The system of claim 1, wherein the detecting the data processing interaction comprises receiving a transaction processing request for an electronic transaction between the first computing device and the second computing device, and wherein the electronic transaction includes a digital payment from the first user using the first computing device to the second user.

3. The system of claim 2, wherein, prior to the generating, the operations further comprise:
determining that the electronic transaction requires the user information to authenticate the first user to the second user on the second computing device, and wherein the user information includes at least a user name and biometric information.

4. The system of claim 2, wherein the transaction processing request includes a request from the first user for the dynamic machine-readable code having the user information, and wherein the request specifies the user information for encoding in the dynamic machine-readable code for the electronic transaction.

5. The system of claim 1, wherein the operations further comprise:
receiving the dynamic machine-readable code from the second computing device; and
populating the user information in an application on the second computing device.

6. The system of claim 5, wherein the populating the user information includes providing at least one of a photo, an email, or an account number to the application on the second computing device.

7. The system of claim 1, wherein the dynamic machine-readable code is decodable by an application on the second computing device to reveal the user information of the first user to the second user.

8. A method comprising:
receiving, over a network connection, a request from a first computing device of a first user for an interaction with a second computing device of a second user at a location;
analyzing the request and the location;
embedding, based on the interaction between the first computing device and the second computing device, user information associated with the first user into a dynamic machine-readable code displayable by the first computing device, wherein the user information is embedded based on the analyzing the request and the location; and
transmitting, in response to the request and to the first computing device, the dynamic machine-readable code that causes a display in an application interface of an application on the first computing device, wherein the transmitting the dynamic machine-readable code enables an image capture of the dynamic machine-readable code by the second computing device at the location.

9. The method of claim 8, wherein the user information is embedded in the dynamic machine-readable code using a middle tier application, and wherein the request for the interaction includes a request for the dynamic machine-readable code generated by the first computing device based, in part, on a private key and a token located on the first computing device.

10. The method of claim 8, wherein the user information includes at least a username and biometric information usable to authenticate the first user for the interaction.

11. The method of claim 8, wherein the user information is encoded using data that causes at least one of a photo, an email, or an account number to be loaded to an application on the second computing device in response to the image capture.

12. The method of claim 8, wherein the interaction comprises processing an electronic transaction at the location, and wherein the user information authenticates the first user to the second user for a payment made by the first user for the electronic transaction.

13. The method of claim 8, further comprising:
determining, based on the analyzing, that the request indicates a fraudulent activity in association with the interaction between the first computing device and the second computing device,
wherein the embedding includes embedding, into the dynamic machine-readable code, additional information usable to verify that the first user is in possession of the first computing device at the location.

14. The method of claim 13, wherein the determining that the request indicates the fraudulent activity is based on at least one of a network connectivity of the first computing device, a user device geographical location, a wearable device of the first user, or sensed data at the location.

15. The method of claim 13, further comprising:
transmitting a notification to one of the first computing device or the second computing device that the request indicates the fraudulent activity.

16. A non-transitory machine readable medium having stored thereon machine readable instructions executable to cause a machine to perform operations comprising:
receiving, from a first computing device of a first user over a network connection, a request for a dynamic machine-readable code usable during a data processing interaction by the first computing device with a second computing device of a second user;
accessing user information that verifies the first user to the second user for the data processing interaction;
determining the dynamic machine-readable code based on the data processing interaction and the user information, wherein the dynamic machine-readable code includes the user information embedded to the dynamic machine-readable code that is decodable by the second computing device;
causing the dynamic machine-readable code to be displayed on the first computing device in an application interface for an application used for the data processing interaction, wherein the dynamic machine-readable code is displayed that enables an image capture of the dynamic machine-readable code by the second computing device in association with the data processing interaction;
receiving the image capture of the dynamic machine-readable code, wherein the image capture includes device information of the second computing device; and
determining whether the device information indicates fraudulent activity by the second computing device.

17. The non-transitory machine readable medium of claim 16, wherein the determining the dynamic machine-readable code comprises embedding the user information in the dynamic machine-readable code using a logic tier for middleware of a multi-tier system that interacts with the first computing device and the second computing device for the dynamic machine-readable code usable with the data processing interaction.

18. The non-transitory machine readable medium of claim 16, wherein the receiving the request comprises:
receiving a notification of the data processing interaction at a location, wherein the data processing interaction comprises an electronic transaction processing request, and wherein the notification includes a request for a user identification of the first user.

19. The non-transitory machine readable medium of claim 16, wherein the device information comprises at least one of a device type, an image resolution, or a screen lock, and wherein the device information includes sensor data captured by the second computing device with the image capture including at least one of a location, a movement, or an orientation of the second computing device.

20. The non-transitory machine readable medium of claim 16, wherein the determining whether the device information indicates the fraudulent activity is based on at least one of location information of the first computing device and the second computing device, Wi-Fi connections of the first computing device and the second computing device, lighting associated with the first computing device and the second computing device, speed of movements of the first computing device and the second computing device, or a presence of others within a contact list or a social network of the first user.

* * * * *